US012581188B2

(12) United States Patent
Sakauchi

(10) Patent No.: US 12,581,188 B2
(45) Date of Patent: Mar. 17, 2026

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Kazuto Sakauchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 18/767,181

(22) Filed: Jul. 9, 2024

(65) Prior Publication Data

US 2025/0047977 A1 Feb. 6, 2025

(30) Foreign Application Priority Data

Aug. 3, 2023 (JP) ................................. 2023-127325

(51) Int. Cl.
| | |
|---|---|
| *H04N 23/667* | (2023.01) |
| *G06F 3/01* | (2006.01) |
| *G06F 3/0346* | (2013.01) |
| *H04N 23/63* | (2023.01) |
| *H04N 23/65* | (2023.01) |

(52) U.S. Cl.
CPC ........... *H04N 23/667* (2023.01); *G06F 3/013* (2013.01); *G06F 3/0346* (2013.01); *H04N 23/63* (2023.01); *H04N 23/65* (2023.01)

(58) Field of Classification Search
CPC ...... H04N 23/667; H04N 23/63; H04N 23/65; H04N 23/651; H04N 23/6812; G06F 3/013; G06F 3/0346
See application file for complete search history.

(56) References Cited

U.S. PATENT DOCUMENTS

| | | | | |
|---|---|---|---|---|
| 2007/0075127 A1* | 4/2007 | Rosenberg | ............ | G06F 1/3203 |
| | | | | 235/375 |
| 2010/0218024 A1* | 8/2010 | Yamamoto | ............ | G06F 3/0346 |
| | | | | 715/740 |
| 2013/0110450 A1* | 5/2013 | Kulik | ...................... | G06F 3/038 |
| | | | | 702/141 |
| 2014/0150530 A1* | 6/2014 | Ten Kate | ............. | G08B 21/043 |
| | | | | 73/37 |
| 2016/0202997 A1* | 7/2016 | Lay | ........................ | G06F 9/4403 |
| | | | | 713/2 |
| 2016/0269613 A1* | 9/2016 | Kallstrom | .............. | H04N 23/62 |
| 2017/0109011 A1* | 4/2017 | Jiang | ................... | G06F 3/04883 |

(Continued)

FOREIGN PATENT DOCUMENTS

| | | |
|---|---|---|
| JP | H0728573 A | 1/1995 |
| JP | 2010262341 A | 11/2010 |

(Continued)

*Primary Examiner* — Timothy J Henn
(74) *Attorney, Agent, or Firm* — Cowan, Liebowitz & Latman, P.C.

(57) ABSTRACT

There is provided an information processing apparatus. A first detection unit detects that a predetermined operation has been performed with respect to the information processing apparatus. A second detection unit detects a change in a position of the information processing apparatus from when the predetermined operation was performed. A control unit performs control to cause the information processing apparatus to transition to a power saving mode when the change in the position has satisfied a predetermined positional criterion.

9 Claims, 6 Drawing Sheets

(56) References Cited

U.S. PATENT DOCUMENTS

| | | | | |
|---|---|---|---|---|
| 2017/0127195 A1* | 5/2017 | Botz | .................... | H04R 25/554 |
| 2021/0368108 A1* | 11/2021 | Shimma | ................ | G06F 1/3215 |
| 2023/0078934 A1* | 3/2023 | Edwards | .......... | H04M 1/72454 |
| | | | | 345/173 |

FOREIGN PATENT DOCUMENTS

| | | | |
|---|---|---|---|
| JP | 2013225041 | A | 10/2013 |
| JP | 5703806 | B2 | 4/2015 |
| JP | 2021082333 | A | 5/2021 |

* cited by examiner

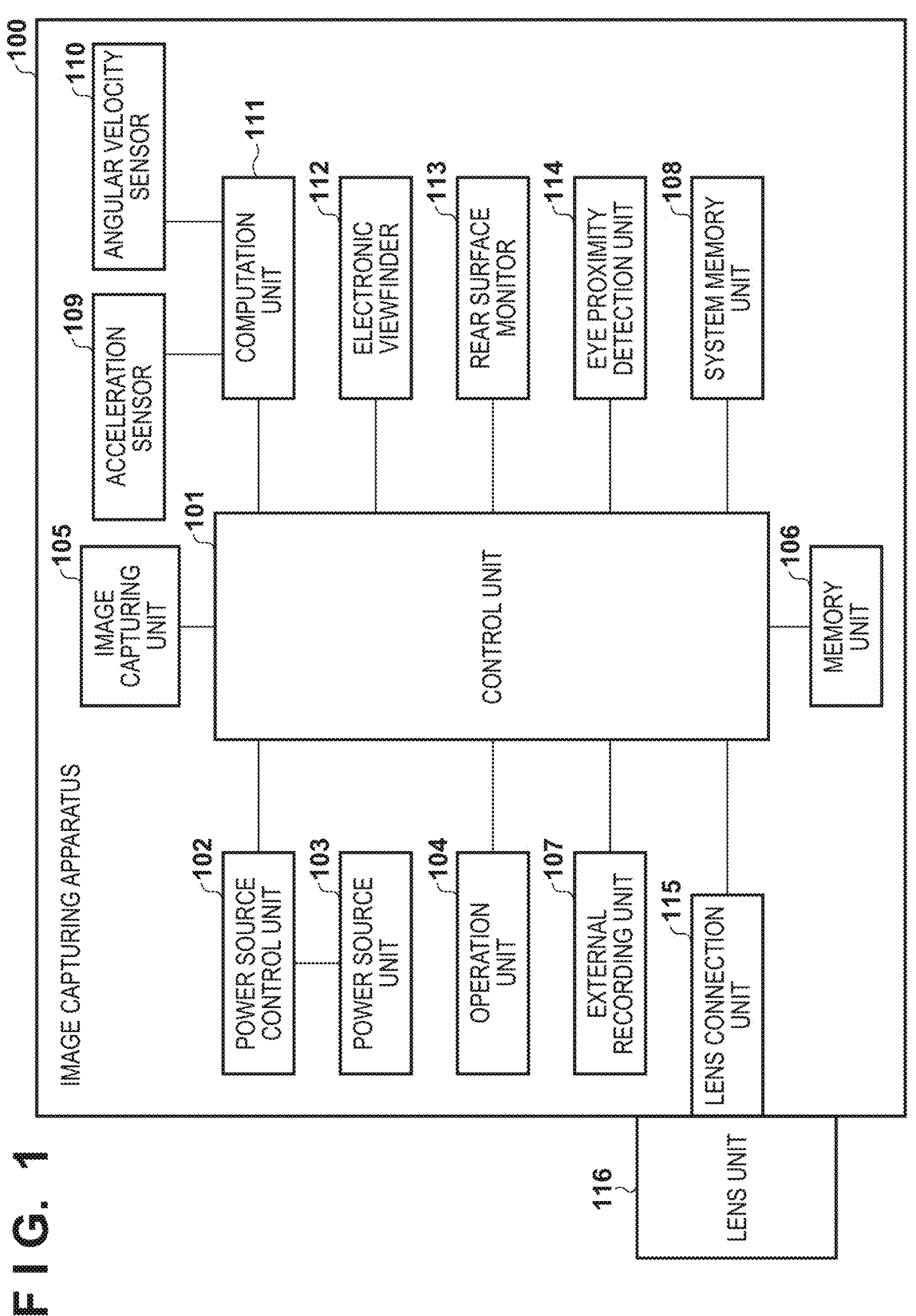
F I G. 1

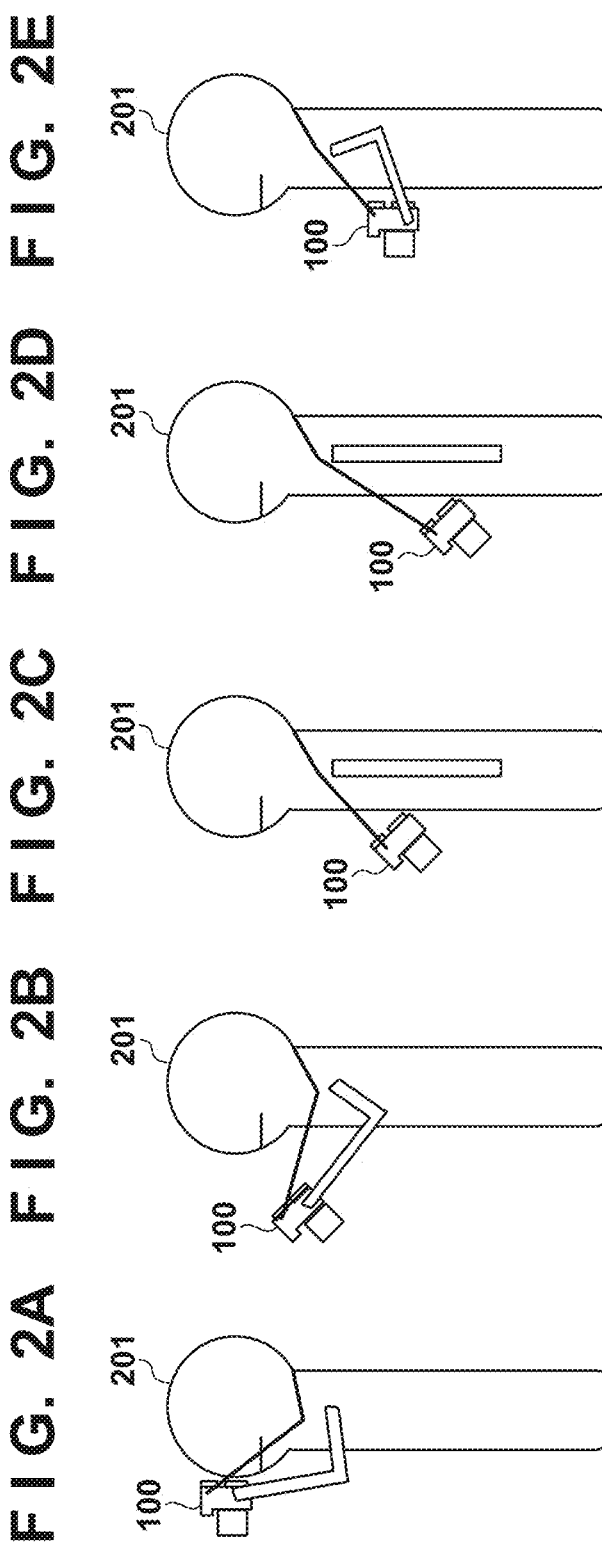

F I G. 3A
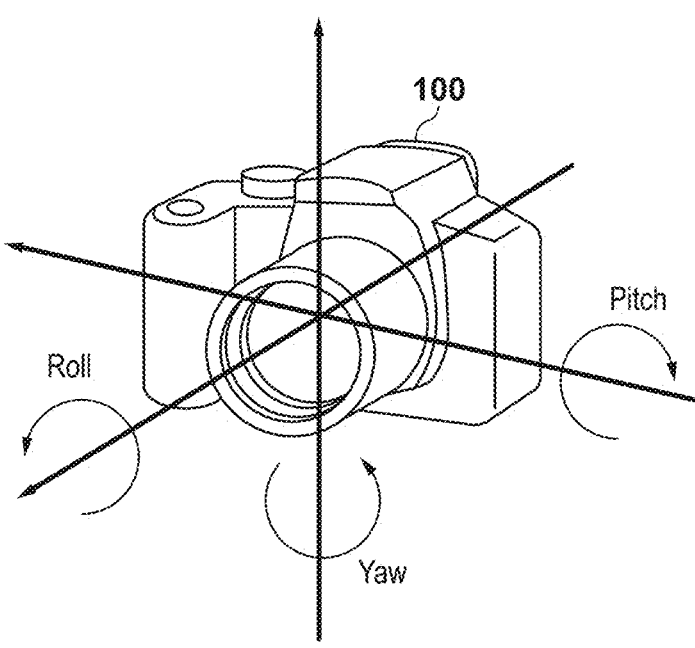
100
Pitch
Roll
Yaw
F I G. 3B
F I G. 3C
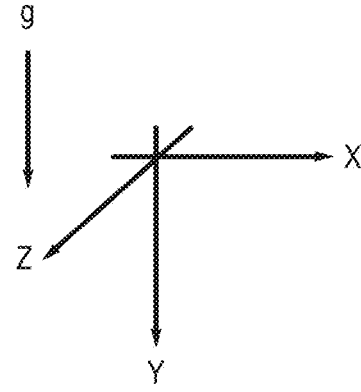
g
301
z
y
x
g
X
Z
Y

F I G.  6
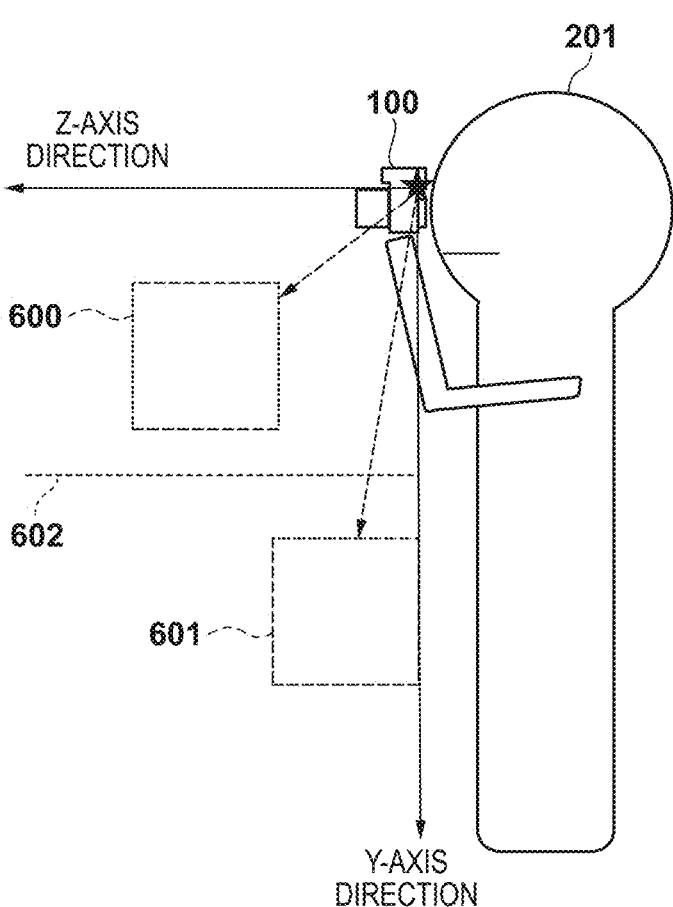

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a storage medium.

Description of the Related Art

In recent years, mirrorless cameras, which are conventional single-lens reflex cameras from which an optical viewfinder and a mirror have been removed, are becoming widespread. A mirrorless camera requires the use of an image display device, such as a liquid crystal monitor, to check a composition before shooting, thereby consuming more battery than a single-lens reflex camera. In order to reduce battery consumption, control is generally performed to cause a camera to automatically transition to a power saving mode when a certain period has elapsed since the last operation was performed. In the power saving mode, the camera performs control to, for example, enter a sleep state, lower a frame rate of an image sensor, and reduce the display luminance of a liquid crystal monitor.

However, a desirable timing of the camera's transition to the power saving mode varies depending on the circumstance. For example, even immediately after a user has performed some sort of operation (before the elapse of a certain period since the last operation was performed), the user may not have the intention to continue the use of the camera. In this case, the camera does not transition to the power saving mode until the certain period elapses even though the user does not use the camera; as a result, wasteful consumption of power occurs.

Japanese Patent Laid-Open No. 2021-82333 and Japanese Patent No. 5703806 are known as techniques to cause an information processing apparatus, such as a camera, to transition to a power saving mode. Japanese Patent Laid-Open No. 2021-82333 discloses a technique to switch among a plurality of modes, including a power saving mode, based on the magnitude of acceleration data of a terminal apparatus and a change in an attitude thereof. Japanese Patent No. 5703806 discloses a technique to refer to the difference between the largest value and the smallest value of attitude information pieces calculated from acceleration data, determine whether an attitude of a camera has changed in accordance with whether the difference has exceeded a threshold, and make a transition to a power saving mode and a cancellation of the power saving mode.

Techniques to control the transition to the power saving mode based on the vibration and attitude of an information processing apparatus, as with Japanese Patent Laid-Open No. 2021-82333 and Japanese Patent No. 5703806, may have difficulty in discerning whether a user has the intention to continue the use of the information processing apparatus depending on the circumstance of use of the information processing apparatus. For example, assume a case where a user of a camera has performed viewfinder shooting (shooting that is performed while looking through a viewfinder) as shown in FIG. 2A, and then transitioned to an attitude of FIG. 2B or FIG. 2C. In the case of FIG. 2B, the user is viewing a liquid crystal panel, hence continuing the use of the camera. In the case of FIG. 2C, the camera is hung around the user's neck without being held by the user, and there is a high possibility that the user has no intention to continue the use of the camera. In this way, the user's intention regarding the use of the camera differs between FIG. 2B and FIG. 2C; however, as the attitudes of the camera therein become similar depending on, for example, the weights of lenses, there is a possibility that the state of FIG. 2B and the state of FIG. 2C cannot be distinguished from each other with conventional techniques.

SUMMARY OF THE INVENTION

The present invention has been made in view of the foregoing situation, and provides a technique to control a transition to a power saving mode based on a change in a position from when a predetermined operation was performed with respect to an information processing apparatus.

According to a first aspect of the present invention, there is provided an information processing apparatus, comprising: a first detection unit configured to detect that a predetermined operation has been performed with respect to the information processing apparatus; a second detection unit configured to detect a change in a position of the information processing apparatus from when the predetermined operation was performed; and a control unit configured to perform control to cause the information processing apparatus to transition to a power saving mode when the change in the position has satisfied a predetermined positional criterion.

According to a second aspect of the present invention, there is provided a control method executed by an information processing apparatus, comprising: detecting that a predetermined operation has been performed with respect to the information processing apparatus; detecting a change in a position of the information processing apparatus from when the predetermined operation was performed; and performing control to cause the information processing apparatus to transition to a power saving mode when the change in the position has satisfied a predetermined positional criterion.

According to a third aspect of the present invention, there is provided a non-transitory computer-readable storage medium which stores a program for causing an information processing apparatus to execute a control method comprising: detecting that a predetermined operation has been performed with respect to the information processing apparatus; detecting a change in a position of the information processing apparatus from when the predetermined operation was performed; and performing control to cause the information processing apparatus to transition to a power saving mode when the change in the position has satisfied a predetermined positional criterion.

Further features of the present invention will become apparent from the following description of exemplary embodiments with reference to the attached drawings.

BRIEF DESCRIPTION OF THE DRAWINGS

FIG. 1 is a block diagram showing a configuration of an image capturing apparatus 100, which is one example of an information processing apparatus.

FIGS. 2A to 2E are diagrams showing examples of positional changes of the image capturing apparatus 100.

FIGS. 3A to 3C are diagrams illustrating the attitude angles and position of the image capturing apparatus 100.

FIG. 6 is a diagram illustrating an example of a predetermined positional criterion that is satisfied when performing control to cause the image capturing apparatus 100 to transition to a power saving mode.

DESCRIPTION OF THE EMBODIMENTS

Figure 4:
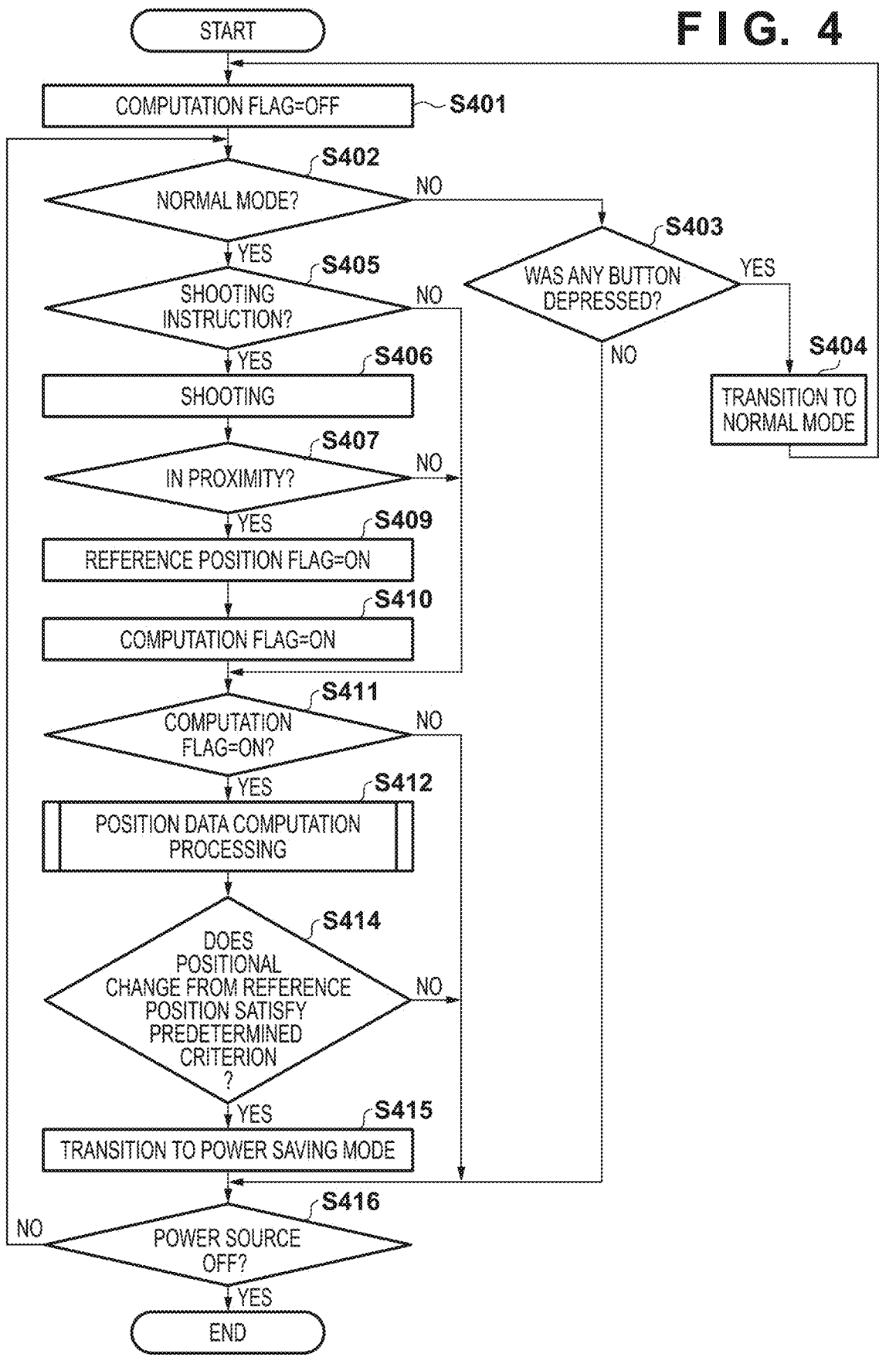
FIG. 4 is a flowchart of processing executed by the image capturing apparatus 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a block diagram showing a configuration of an image capturing apparatus 100, which is one example of an information processing apparatus. In FIG. 1, a control unit 101 includes at least one processor, and controls the operations of the entire image capturing apparatus 100. The control unit 101 controls the entire image capturing apparatus 100 by reading out a program for controlling the image capturing apparatus 100 from a later-described memory unit 106, deploying a part of the program to a later-described system memory unit 108, and executing the part of the program.

A power source control unit 102 is composed of a battery detection circuit, a protection circuit, a DC-DC converter, an LDO regulator, and the like. The power source control unit 102 converts power supplied from a later-described power source unit 103 into a desired voltage, and supplies the voltage to each electronic device inside the image capturing apparatus 100. Also, the power source control unit 102 has a function of detecting whether a battery has been loaded, a battery type, and a remaining battery level. Furthermore, the power source control unit 102 has a function of protecting a load circuit connected to a power source circuit by blocking a power source when an overcurrent has been detected. In addition, the power source control unit 102 includes a power detection circuit capable of detecting the amount of power to be supplied to each unit inside the image capturing apparatus 100.

The power source unit 103 is composed of, for example, a secondary battery, such as a NiCd battery, a NiMI battery, and a Li battery, and an AC adapter.

An operation unit 104 includes an operation mechanism for inputting various types of operation instructions to the control unit 101. The operation mechanism is composed of at least one of a switch, a dial, a touch panel, a sound recognition apparatus, and the like, or any combination of these. A release button included in the operation unit 104 is composed of a two-step switch including a first release switch and a second release switch. When a pressing operation in the first step has been performed on the release button, the first release switch is pushed, and a first operation instruction is output to the control unit 101. When a pressing operation in the second step has been performed on the release button, the second release switch is pushed, and a second operation instruction is output to the control unit 101.

An image capturing unit 105 is composed of, for example, an image sensor, such as a CMOS and a CCD. The image capturing unit 105 executes image capturing control based on an instruction from the control unit 101. Furthermore, the image capturing unit 105 transmits obtained captured images to the control unit 101.

The memory unit 106 is composed of, for example, a ROM, which is an electrically erasable and recordable nonvolatile memory. The memory unit 106 stores constants for the operations of the control unit 101, a program, and the like. The program mentioned here denotes a program for executing processing of various types of flowcharts that will be described later in the present embodiment.

An external recording unit 107 includes an attachable/removable recording medium, such as a semiconductor memory. Image data obtained through shooting is recorded in the external recording unit 107.

A system memory unit 108 is composed of a RAM or the like. The program that has been read out from the memory unit 106, as well as the constants, variables, and the like for the operations of the control unit 101, are deployed to the system memory unit 108. Furthermore, the system memory unit 108 temporarily holds images obtained by the image capturing unit 105.

An acceleration sensor 109 obtains acceleration data corresponding to the motion and attitude of the image capturing apparatus 100. An angular velocity sensor 110 obtains angular velocity data corresponding to the motion and attitude of the image capturing apparatus 100. The image capturing apparatus 100 may include a geomagnetic sensor, a direction sensor, and the like in addition to the acceleration sensor 109 and the angular velocity sensor 110, where necessary.

A computation unit 111 calculates the attitude angle (pitch angle, yaw angle, or roll angle) and position of the image capturing apparatus 100 based on the acceleration data and the angular velocity data obtained from the acceleration sensor 109 and the angular velocity sensor 110.

An electronic viewfinder 112 is a display apparatus that is configured using organic EL or the like. The control unit 101 can display a menu screen stored in a display data region of the system memory unit 108, images stored in the external recording unit 107, and the like on the electronic viewfinder 112. Furthermore, viewfinder shooting can be performed also on a single-lens mirrorless camera by successively displaying the pieces of captured image data obtained from the image capturing unit 105 on the electronic viewfinder 112 as through-the-lens images in real time.

A rear surface monitor 113 is a display apparatus that is configured using liquid crystals, organic EL, or the like. The control unit 101 can display a menu screen stored in the display data region of the system memory unit 108, images stored in the external recording unit 107, and the like on the rear surface monitor 113. Furthermore, live-view shooting can be performed by successively displaying the pieces of captured image data obtained from the image capturing unit 105 on the rear surface monitor 113 as through-the-lens images in real time.

An eye proximity detection unit 114 detects whether the user, who is the photographer, is in a state where they are looking into the electronic viewfinder 112 (their eye is in proximity to the electronic viewfinder 112), or in a state where their eye is distanced from the electronic viewfinder 112. The eye proximity detection unit 114 is composed of, for example, a proximity sensor, such as an infrared sensor, or the like.

A lens connection unit 115 is composed of a mechanism for allowing a later-described lens unit 116 to be attached or detached, a communication terminal for performing focus control and diaphragm driving control, and the like.

The lens unit 116 is an interchangeable lens unit, and is composed of non-illustrated image capturing lenses, a control unit for driving the lens for focus control and for driving a diaphragm, and the like.

With reference to FIG. 2A to FIG. 6, the following describes control to switch to a power saving mode of the image capturing apparatus 100, which is performed based on position data obtained by the computation unit 111. In the case of the power saving mode, the image capturing apparatus 100 performs control so that consumed power becomes small compared to the case of a normal mode (non-power saving mode). No particular restriction is intended regarding specific control for reducing consumed power; for example, the image capturing apparatus 100 can reduce consumed power by performing control to stop the operations of the image capturing unit 105. In another example, the image capturing apparatus 100 may perform control to turn OFF the power sources of the electronic viewfinder 112 and the rear surface monitor 113. In still another example, the image capturing apparatus 100 may perform both of the control to stop the operations of the image capturing unit 105, and the control to turn OFF the power sources of the electronic viewfinder 112 and the rear surface monitor 113.

FIGS. 2A to 2E are diagrams showing examples of positional changes of the image capturing apparatus 100. FIG. 2A is a diagram showing a state where a user 201 is shooting while looking into the electronic viewfinder 112 of the image capturing apparatus 100.

After viewfinder shooting (shooting that is performed while the proximity of the user's eye to the electronic viewfinder 112 is detected), the user 201 transitions to a variety of attitudes, and the image capturing apparatus 100 also moves in response. For example, the user 201 transitions to the attitude shown in FIG. 2B. FIG. 2B is a diagram showing a state where the user 201 is viewing the rear surface monitor 113 while stretching out their arms supporting the image capturing apparatus 100 in order to reproduce a shot image or configure settings of the image capturing apparatus 100. At this time, there is a high possibility that the user 201 will operate the image capturing apparatus 100, or perform the next shooting soon. Therefore, it is desirable to maintain an operation mode of the image capturing apparatus 100 at the normal mode (non-power saving mode).

FIG. 2C and FIG. 2D are diagrams showing a state where the user 201 has lowered the image capturing apparatus 100 and is thus in an attitude where the image capturing apparatus 100 is hung around the user's neck. FIG. 2D shows a case where a strap has been made long compared to the case of FIG. 2C. In the states shown in FIG. 2C and FIG. 2D, the possibility that the user 201 will operate the image capturing apparatus 100 is low, and the possibility that the next shooting will be performed soon is also low. Therefore, it is desirable to cause the image capturing apparatus 100 to transition to the power saving mode.

FIG. 2E is a diagram showing a state where the user 201 has lowered the image capturing apparatus 100 similarly to the cases of FIG. 2C and FIG. 2D, but is holding the image capturing apparatus 100 so it faces forward. At this time, there is a high possibility that the user 201 has the intention to perform shooting continuously. Therefore, it is desirable to maintain the image capturing apparatus 100 in the normal mode.

In the present embodiment, the control unit 101 determines whether to cause the image capturing apparatus 100 to transition to the power saving mode in accordance with a positional change caused by a movement of the image capturing apparatus 100 that has been exemplarily described above.

FIGS. 3A to 3C are diagrams illustrating the attitude angles and position of the image capturing apparatus 100. FIG. 3A is a diagram showing the definitions of directions of rotation around attitude angles of the image capturing apparatus 100. In a state where the user is holding the image capturing apparatus 100 in a normal position, rotation in the forward or backward tilt direction is defined as rotation in the pitch direction, rotation in the pan direction corresponding to a leftward or rightward swing is defined as rotation in the yaw direction, and rotation around the direction of the lens optical axis is defined as rotation in the roll direction. Also, their rotation angles are defined as a pitch angle, a yaw angle, and a roll angle, respectively. Furthermore, the definition of data indicating an attitude angle (attitude angle data) will be described later.

FIG. 3B is a schematic diagram of a sensor coordinate system in which the axis directions change as a result of rotation of sensors such as the acceleration sensor 109 and the angular velocity sensor 110. FIG. 3C is a schematic diagram of an absolute coordinate system in which the gravity direction g is used as a criterion and the axis directions do not change even if the sensors have moved. A sensor 301, which includes the acceleration sensor 109 and the angular velocity sensor 110, is fixed inside the image capturing apparatus 100; therefore, the sensor coordinate system changes in direction in accordance with rotation of the image capturing apparatus 100. Therefore, the sensor coordinate system is defined under the assumption that, when viewing the image capturing apparatus 100 from behind, the height direction is the y-axis direction, the left-right direction is the x-axis direction, and the front-back direction is the z-axis direction. On the other hand, in the absolute coordinate system, the gravity direction g is defined as the Y-axis direction, the direction of the lens optical axis at a timing of a predetermined operation that serves as a criterion (described later) is defined as the Z-axis direction, and the axis perpendicular to the Y-axis and Z-axis is defined as the X-axis direction.

FIG. 4 is a flowchart of processing executed by the image capturing apparatus 100. Each type of processing in the flowchart of FIG. 4 is realized as a result of the control unit 101 controlling each unit of the image capturing apparatus 100 by deploying the program stored in the memory unit 106 to the system memory unit 108 and executing the program. Processing of the present flowchart is started when the user has turned ON the power source of the image capturing apparatus 100.

In step S401, the control unit 101 sets a computation flag to OFF. The computation flag is a flag that is used to switch between a state where position data computation processing of step S412, which will be described later, is to be executed and a state where it is not to be executed.

In step S402, the control unit 101 determines whether the operation mode of the image capturing apparatus 100 is the normal mode (non-power saving mode). In the case of the normal mode, processing proceeds to step S405; otherwise (in the case of the power saving mode), processing proceeds to step S403. It is assumed that the operation mode of the image capturing apparatus 100 is the normal mode at the time when the power source is turned ON.

In step S403, the control unit 101 determines whether any of the buttons of the operation unit 104 has been depressed. In a case where a button has been depressed, processing proceeds to step S404. In a case where a button has not been depressed, the control unit 101 skips step S404 and causes processing to proceed to step S416.

In step S404, the control unit 101 switches the operation mode of the image capturing apparatus 100 to the normal mode. That is to say, when any of the buttons has been depressed in the power saving mode, the image capturing apparatus 100 returns to the normal mode. Thereafter, processing returns to step S401.

In step S405, the control unit 101 determines whether a shooting instruction has been issued. The control unit 101 determines that the shooting instruction has been issued in a case where the pressing operation in the second step has been performed on the release button included in the operation unit 104. In a case where the shooting instruction has been issued, processing transitions to step S406; otherwise, processing transitions to step S411. Note that the user can also assign the function of the shooting instruction to any button included in the operation unit 104 by configuring a setting on a setting screen of the image capturing apparatus 100.

In step S406, the control unit 101 shoots an image. In the shooting, the control unit 101 reads out image signals from the image capturing unit 105, and records them as a still image.

In step S407, using the eye proximity detection unit 114, the control unit 101 determines whether an eye of the user 201 is in proximity to the electronic viewfinder 112. In a case where an eye of the user 201 is in proximity to the electronic viewfinder 112 (i.e., in a case where it is considered that viewfinder shooting has been performed), processing transitions to step S409. In a case where an eye of the user 201 is not in proximity to the electronic viewfinder 112 (i.e., in a case where it is considered that viewfinder shooting has been performed), processing transitions to step S411. Note that processing of step S407 can be omitted. In this case, after the shooting has been performed in step S406, processing proceeds to step S409. Note that the image capturing apparatus 100 may include a dedicated button for making a transition to step S409.

In step S409, the control unit 101 sets a reference position flag to ON. A reference position denotes an initial position in computing position data. In a case where the reference position flag has been set to ON, the X-axis direction and the Z-axis direction of the absolute coordinate system shown in FIG. 3C are updated in the position data computation processing (step S412), which will be described later.

In step S410, the control unit 101 sets the computation flag to ON.

In step S411, the control unit 101 determines whether the computation flag is ON. In a case where the computation flag is ON, processing proceeds to step S412; in a case where the computation flag is OFF, processing proceeds to step S416.

In step S412, using the computation unit 111, the control unit 101 executes processing for computing position data of the image capturing apparatus 100 (the position data computation processing). In a case where the computation flag is ON, the position data computation processing is carried out in every specific cycle of data obtainment by the acceleration sensor 109 and the angular velocity sensor 110. The position data obtained here indicates a position relative to the reference position (a positional change from the reference position). Therefore, the position data computation processing enables the control unit 101 to detect a change in the position of the image capturing apparatus 100 from when the viewfinder shooting (predetermined operation) was performed. The details of the position data computation processing will be described later with reference to FIG. 5.

In step S414, the control unit 101 determines, based on the position data computed in step S412, whether the positional change from the reference position (the change in the position of the image capturing apparatus 100 from when the viewfinder shooting was performed) satisfies a predetermined positional criterion. The predetermined positional criterion is a criterion that is set in advance so as to enable distinction between a situation where there is a high possibility that the user will use the image capturing apparatus 100 continuously (e.g., 2B), and a situation where there is a high possibility that the user has finished using the image capturing apparatus 100 (e.g., FIG. 2C), with the highest accuracy possible. Examples of the predetermined positional criterion will be described later. In a case where the positional change satisfies the predetermined positional criterion, processing transitions to step S415; in a case where the positional change does not satisfy the predetermined positional criterion, processing transitions to step S416. Note that it is permissible to adopt a configuration in which processing proceeds to step S415 after a predetermined period has elapsed since the positional change satisfied the predetermined positional criterion, with use of a non-illustrated timer.

In step S415, the control unit 101 performs control to cause the image capturing apparatus 100 to transition to the power saving mode.

In step S416, the control unit 101 determines whether the user 201 has turned OFF the power source of the image capturing apparatus 100. In a case where the power source has been turned OFF, processing of the present flowchart is ended. In a case where the power source has not been turned OFF, processing returns to step S402.

Figure 5:
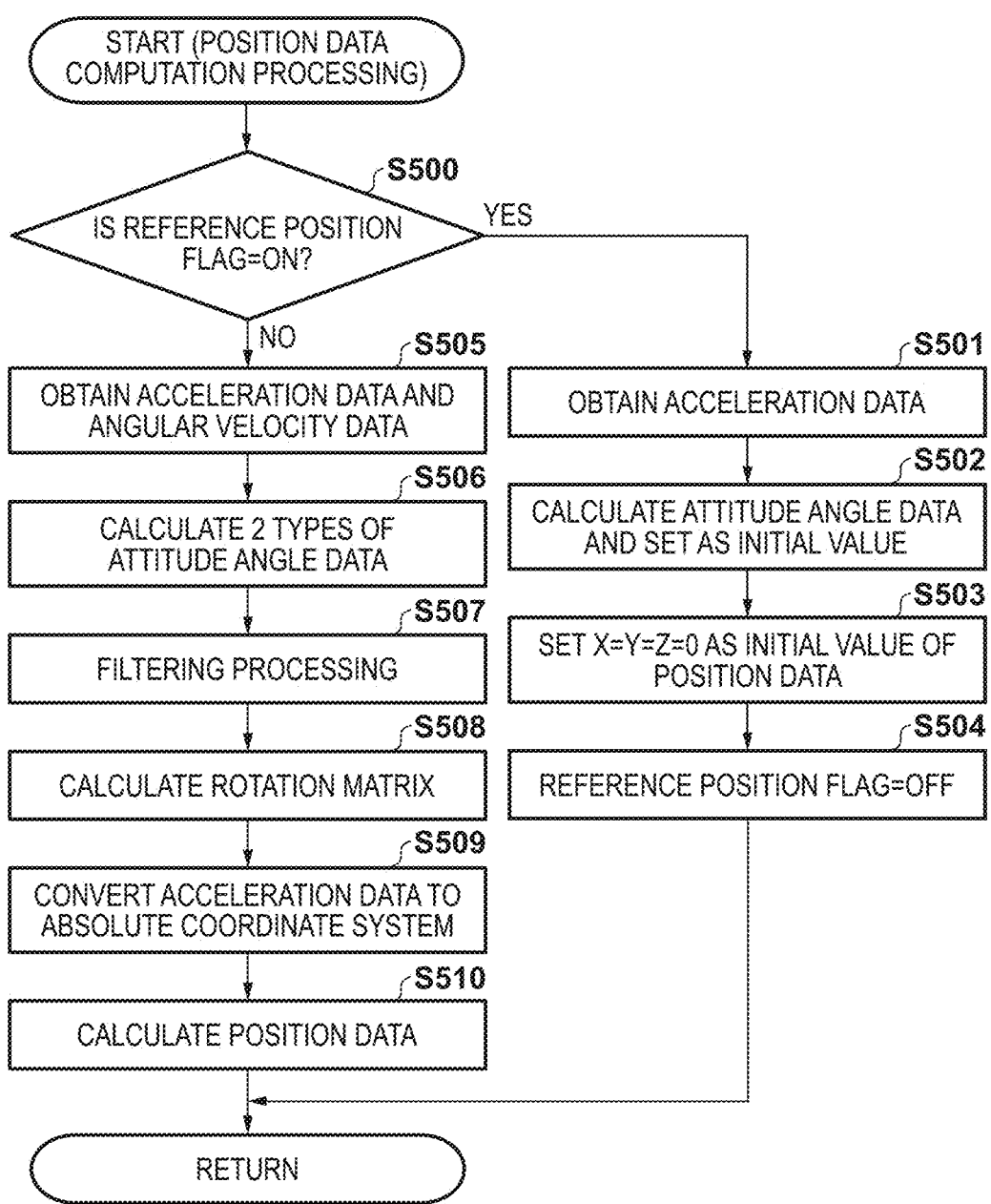
FIG. 5 is a flowchart showing the details of position data computation processing (step S412 of FIG. 4).

FIG. 5 is a flowchart showing the details of the position data computation processing (step S412 of FIG. 4). In step S500, the control unit 101 determines whether the reference position flag is ON. In a case where the reference position flag is ON, the control unit 101 causes processing to proceed to step S501 in order to update the X-axis direction and the Z-axis direction of the absolute coordinate system shown in FIG. 3C. In a case where the reference position flag is OFF, processing proceeds to step S505.

In step S501, the computation unit 111 obtains acceleration data of the image capturing apparatus 100 from the acceleration sensor 109.

In step S502, the computation unit 111 calculates attitude angle data based on the acceleration data obtained in step S501, and sets the calculated attitude angle data as an initial value of the attitude angle data.

In step S503, the computation unit 111 sets X=Y=Z=0 as an initial value of position data (a reference position).

In step S504, the control unit 101 sets the reference position flag to OFF.

The acceleration data obtained in step S501 is detected with respect to each of the three axis directions as a sum of acceleration associated with a motion and gravitational acceleration in accordance with the attitude of the acceleration sensor 109 of the image capturing apparatus 100. Attitude angle data based on the acceleration data is calculated based on the proportion of gravitational acceleration in the acceleration data. Therefore, in order to exclude the influence of acceleration associated with a motion, the attitude angle data can be computed based on acceleration data that has been obtained in a state where the image capturing apparatus 100 is stationary. In a state where the image capturing apparatus 100 is stationary, the angular velocity data is 0, and thus the attitude angle data can be calculated using only acceleration data, without using angular velocity data, in step S502.

Also, an attitude angle is, for example, an Euler angle, and the attitude of the image capturing apparatus 100 can be represented by obtaining three angles at certain time t. These three angles are the pitch angle, yaw angle, and roll angle, for example.

The attitude of the image capturing apparatus 100 changes in a variety of directions depending on, for example, how the user holds and uses the apparatus. Accordingly, as shown in FIG. 3B, the coordinate axes of the acceleration sensor 109 that obtains acceleration data change as well. In contrast, the direction of gravitational acceleration is always constant in the height direction relative to the Earth. Therefore, the absolute coordinate axes shown in FIG. 3C are obtained by defining the yaw direction at an arbitrary angle in setting the initial value of the attitude angle data obtained from the acceleration data in step S502. The attitude of the image capturing apparatus 100 can be represented by calculating attitude angle data while using these absolute coordinate axes as a criterion. Furthermore, quaternions may be used as a method of representing the attitude.

As described above, in a case where the reference position flag is ON, the initial value of the attitude angle data and the initial value of the position data (reference position) are set through processing of steps S501 to S503. As can be understood from FIG. 4 (steps S405 to S409) and FIG. 5 (steps S501 to S503), the reference position flag is set to ON in response to the execution of viewfinder shooting, and set to OFF after the initial value of the attitude angle data and the initial value of the position data have been set. Therefore, it can be said that the initial value of the attitude angle data and the initial value of the position data (reference position) practically correspond to the attitude and position of the image capturing apparatus 100 when the viewfinder shooting has been performed.

In step S505, the computation unit 111 obtains acceleration data of the image capturing apparatus 100 from the acceleration sensor 109, and obtains angular velocity data of the image capturing apparatus 100 from the angular velocity sensor 110.

In step S506, the computation unit 111 calculates attitude angle data based on the acceleration data obtained in step S505, and attitude angle data based on the angular velocity data obtained in step S505. These two types of attitude angle data are each calculated using the initial value calculated in step S502.

The attitude angle data based on the acceleration data is calculated using the proportion of gravitational acceleration, similarly to step S502.

The attitude angle data based on the angular velocity data can be calculated by, based on the initial value of the attitude angle data based on the acceleration data calculated in step S502, converting the angular velocity data into derivative values of the attitude angle data, and performing integration.

In step S507, the computation unit 111 executes filtering processing for correcting the two types of attitude angle data calculated in step S506. This filtering processing is processing which uses, for example, a complementary filter, and in which the computation unit 111 performs computation by adding complementary weights to the two types of attitude angle data calculated in step S506. This filtering processing corrects a drift component and a component of an offset from a zero point in the attitude angle data, thereby yielding attitude angle data after the filtering processing.

In step S508, based on the attitude angle data after the filtering processing yielded in step S507, the computation unit 111 calculates a rotation matrix for applying coordinate conversion to the acceleration data.

In step S509, the computation unit 111 converts the acceleration data from the sensor coordinate system into the absolute coordinate system using the rotation matrix obtained in step S508.

In step S510, the computation unit 111 calculates position data by performing second-order integration of the acceleration data after the coordinate conversion obtained in step S509. The position data calculated here indicates a position in the absolute coordinate system shown in FIG. 3C, and the reference position of the absolute coordinate system (X=Y=Z=0) is set in step S503 when the viewfinder shooting has been performed. Therefore, the position data indicates a position relative to the reference position (a positional change from the reference position), and the control unit 101 can detect a change in the position of the image capturing apparatus 100 from when the viewfinder shooting (predetermined operation) was performed through the position data computation processing.

FIG. 6 is a diagram illustrating an example of the predetermined positional criterion that is satisfied when performing control to cause the image capturing apparatus 100 to transition to the power saving mode. For example, in a case where the user shifts to the attitude shown in FIG. 2B after performing viewfinder shooting in the attitude shown in FIG. 2A, the image capturing apparatus 100 changes in position by approximately 15 cm downward in the height direction (gravity direction) after the shooting, thereby moving to the inside of a zone 600 of FIG. 6. Meanwhile, in a case where the user shifts to the attitude shown in FIG. 2C after performing viewfinder shooting in the attitude shown in FIG. 2A, the image capturing apparatus 100 changes in position by approximately 30 cm downward in the height direction (gravity direction) after the shooting, thereby moving to the inside of a zone 601 of FIG. 6. As stated earlier, it is desirable not to cause the image capturing apparatus 100 to transition to the power saving mode in the case of FIG. 2B, and it desirable to cause the image capturing apparatus 100 to transition to the power saving mode in the case of FIG. 2C.

In view of this, the position of the image capturing apparatus 100 can be categorized into a plurality of zones as shown in FIG. 6, and a threshold (predetermined threshold) in the Y-axis direction (gravity direction) can be set, as indicated by a threshold line 602, based on each zone. In this case, the control unit 101 can perform control to cause the image capturing apparatus 100 to transition to the power saving mode in a case where the change in the position of the image capturing apparatus 100 in the gravity direction has exceeded the predetermined threshold corresponding to the threshold line 602. In this way, the predetermined positional criterion may include a criterion where the change in the position of the image capturing apparatus 100 in the gravity direction exceeds the predetermined threshold.

Note that the predetermined positional criterion is not limited to the example shown in FIG. 6. For example, the control unit 101 may set thresholds for the X-axis, Y-axis, and the Z-axis, respectively, and cause the image capturing apparatus 100 to transition to the power saving mode in a case where the change in the position has exceeded all of the thresholds for the three axes (or has exceeded the threshold for one of the axes).

Also, the control unit 101 may change the threshold line 602 in accordance with an attachment status of an accessary to the image capturing apparatus 100. The accessary denotes an attachable/removable apparatus or tool, such as a lens, a strap, an external flash, an external microphone, an external grip, and an extended battery. For example, as can be understood from comparison between FIG. 2C and FIG. 2D, the positional change from FIG. 2A varies depending on the length of the strap attached to the image capturing apparatus 100, even if the apparatus is in the same attitude, that is to say, hung around the neck. In view of this, the control unit 101 may move the threshold line 602 down in a case where the strap has been lengthened, and move the threshold line 602 up in a case where the strap has been shortened. As another example related to the attachment status of the accessory, the control unit 101 may change the threshold line 602 in accordance with the weight or the length of the lens unit 116 attached to the image capturing apparatus 100. In this way, the control unit 101 may set (or update) the threshold in accordance with the attachment status of the accessory to the image capturing apparatus 100.

Depending on the type of the accessory, the control unit 101 can obtain information related to the attachment status of the accessory from the accessory. For example, the control unit 101 can obtain information indicating the weight and the length of the lens unit 116 from the lens unit 116. As another example, the control unit 101 may obtain information related to the attachment status of the accessory that has been set by the user on a setting screen of the image capturing apparatus 100.

Also, the control unit 101 may automatically update the threshold for each user 201 in accordance with position data pieces corresponding to the time of image confirmation, the time of configuration of a setting, and the time when the apparatus is hung around the neck. Furthermore, the control unit 101 may update the threshold through data analysis in machine learning or the like.

Note that when determining whether to cause the image capturing apparatus 100 to transition to the power saving mode, the control unit 101 may use the attitude angle data after the filtering processing obtained in step S507 of FIG. 5 in addition to the position data. By using both of the position data and the attitude angle data after the filtering processing, for example, the attitude shown in FIG. 2C and the attitude shown in FIG. 2E can be distinguished from each other. After the user 201 has performed viewfinder shooting in the attitude shown in FIG. 2A, if they have lowered the image capturing apparatus 100 while holding it with both hands with its attitude angle maintained as shown in FIG. 2E, it is considered that the user 201 has the intention to continue the shooting, unlike the case of FIG. 2C. Therefore, in the case of FIG. 2E, it is desirable to maintain the image capturing apparatus 100 in the normal mode. However, in the case of FIG. 2C and in the case of FIG. 2E, the change in the position is the same, and the image capturing apparatus 100 is inside the zone 601 of FIG. 6 in both cases. Therefore, it is difficult to distinguish between the case of FIG. 2C and the case of FIG. 2E based on the position data. For this reason, the control unit 101 uses the attitude angle data in addition to the position data. Comparing the attitude angle data after the filtering of the image capturing apparatus 100 in the case of FIG. 2C with that in the case of FIG. 2E, the image capturing apparatus 100 is inclined at an angle of approximately 45° C. in the pitch direction in FIG. 2C, but the image capturing apparatus 100 is hardly inclined in FIG. 2E. Therefore, the control unit 101 causes the image capturing apparatus 100 to transition to the power saving mode in a case where the change in the position satisfies the predetermined positional criterion and the attitude angle satisfies a predetermined angle criterion (e.g., the inclination of the image capturing apparatus 100 is equal to or smaller than a threshold). This makes it possible to distinguish between the case of FIG. 2C and the case of FIG. 2E, and cause the image capturing apparatus 100 to transition to the power saving mode only in the case of FIG. 2C.

As described above, according to the first embodiment, the image capturing apparatus 100 detects that the predetermined operation (e.g., viewfinder shooting) has been performed, and detects a change in the position of the image capturing apparatus 100 from when the predetermined operation was performed. The image capturing apparatus 100 performs control to cause the image capturing apparatus 100 to transition to the power saving mode when the change in the position has satisfied the predetermined positional criterion. This increases the possibility that the image capturing apparatus 100 transitions to the power saving mode at a timing desired by the user.

Note that although the above description has been provided using the image capturing apparatus 100 as an example of the information processing apparatus, the information processing apparatus is not limited to the image capturing apparatus in the present embodiment. For example, the information processing apparatus may be a smartphone. The above-described predetermined operation, predetermined positional criterion, and the like are determined as appropriate in accordance with the type of the information processing apparatus so as to enable distinction between a case where the user has the intention to use the information processing apparatus and a case where the user has no such intention with the highest accuracy possible.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-127325, filed Aug. 3, 2023, which is hereby incorporated by reference herein in its entirety.

What is claimed is:

1. An information processing apparatus, comprising at least one processor and/or at least one circuit which functions as:

a first detection unit configured to detect that a predetermined operation has been performed with respect to the information processing apparatus;

a second detection unit configured to detect a change in a position of the information processing apparatus from when the predetermined operation was performed;

a control unit configured to perform control to cause the information processing apparatus to transition to a power saving mode when the change in the position exceeds a predetermined threshold; and a setting unit configured to set the predetermined threshold in accordance with an attachment status of an accessory to the information processing apparatus.

2. The information processing apparatus according to claim 1, wherein the control unit performs control to cause the information processing apparatus to transition to the power saving mode when a change in the position in a gravity direction exceeds the predetermined threshold.

3. The information processing apparatus according to claim 1, wherein the second detection unit detects an attitude angle of the information processing apparatus, and the control unit performs control to cause the information processing apparatus to transition to the power saving mode when the change in the position has satisfied the predetermined positional criterion and the attitude angle has satisfied a predetermined angle criterion.

4. The information processing apparatus according to claim 1, further comprising an acceleration sensor and an angular velocity sensor, wherein the second detection unit detects the change in the position based on acceleration data obtained from the acceleration sensor and on angular velocity data obtained from the angular velocity sensor.

5. The information processing apparatus according to claim 1, further comprising an image capturing unit, wherein the predetermined operation is an operation to perform shooting with use of the image capturing unit.

6. The information processing apparatus according to claim 1, further comprising:

an image capturing unit; and a viewfinder, wherein the at least one processor and/or the at least one circuit further functions as a third detection unit configured to detect proximity of an eye of a user to the viewfinder, wherein the predetermined operation is an operation to perform shooting with use of the image capturing unit while proximity of an eye of the user to the viewfinder is detected.

7. The information processing apparatus according to claim 5, wherein the control unit performs control so that an operation of the image capturing unit stops in the power saving mode.

8. A control method executed by an information processing apparatus, comprising:

detecting that a predetermined operation has been performed with respect to the information processing apparatus;

detecting a change in a position of the information processing apparatus from when the predetermined operation was performed;

performing control to cause the information processing apparatus to transition to a power saving mode when the change in the position exceeds a predetermined threshold; and setting the predetermined threshold in accordance with an attachment status of an accessory to the information processing apparatus.

9. A non-transitory computer-readable storage medium which stores a program for causing an information processing apparatus to execute a control method comprising:

detecting that a predetermined operation has been performed with respect to the information processing apparatus;

detecting a change in a position of the information processing apparatus from when the predetermined operation was performed; and performing control to cause the information processing apparatus to transition to a power saving mode when the change in the position exceeds a predetermined threshold; and setting the predetermined threshold in accordance with an attachment status of an accessory to the information processing apparatus.

* * * * *